United States Patent
Zhan et al.

(10) Patent No.: US 12,055,724 B2
(45) Date of Patent: Aug. 6, 2024

(54) OPTICAL DISPLAY SYSTEM AND ELECTRONIC DEVICE

(71) Applicants: University of Central Florida Research Foundation, Inc., Orlando, FL (US); Goertek Inc., Shandong (CN)

(72) Inventors: Tao Zhan, Orlando, FL (US); En-Lin Hsiang, Orlando, FL (US); Jianghao Xiong, Orlando, FL (US); Shin-Tson Wu, Orlando, FL (US); Kun Li, Santa Clara, CA (US)

(73) Assignees: University of Central Florida Research Foundation, Inc., Orlando, FL (US); Goertek Inc., Shandong (CN)

( * ) Notice: Subject to any disclaimer, the term of this patent is extended or adjusted under 35 U.S.C. 154(b) by 0 days.

(21) Appl. No.: 18/265,889

(22) PCT Filed: Dec. 20, 2021

(86) PCT No.: PCT/CN2021/139685
§ 371 (c)(1),
(2) Date: Jun. 7, 2023

(87) PCT Pub. No.: WO2022/135345
PCT Pub. Date: Jun. 30, 2022

(65) Prior Publication Data
US 2024/0036322 A1  Feb. 1, 2024

Related U.S. Application Data

(60) Provisional application No. 63/128,281, filed on Dec. 21, 2020.

(51) Int. Cl.
G02B 27/01 (2006.01)
G02B 5/30 (2006.01)
G02B 27/28 (2006.01)

(52) U.S. Cl.
CPC ....... *G02B 27/0172* (2013.01); *G02B 5/3016* (2013.01); *G02B 27/283* (2013.01); *G02B 2027/0178* (2013.01)

(58) Field of Classification Search
CPC .............. G02B 27/0172; G02B 5/3016; G02B 27/283; G02B 2027/0178
See application file for complete search history.

(56) References Cited

U.S. PATENT DOCUMENTS

| 10,901,217 B1 | 1/2021 | Yoon et al. |
| 2018/0231778 A1* | 8/2018 | Yoon ........................ G02B 3/08 |

(Continued)

FOREIGN PATENT DOCUMENTS

| CN | 111630438 A | 9/2020 |
| CN | 112840261 A | 5/2021 |
| TW | 497000 B | 8/2002 |

*Primary Examiner* — Sejoon Ahn
(74) *Attorney, Agent, or Firm* — Baker Botts LLP

(57) ABSTRACT

An optical display system and an electronic device are disclosed. The optical display system comprises: an image generating unit, which generates an image light output, wherein the image light output has a narrow angular luminance distribution; and an optical lens system, which is placed in front of the image generating unit and guides the image light output to an eye of a viewer, wherein the image generating unit includes: an image generating component, which generates a polarized light output; a polarization-dependent light deflection component, disposed to accept the polarized light output from the image-generating component and increase the amount of the polarized light output that can enter an exit pupil of the optical lens system, and the polarized light output deflected by the polarization-dependent light deflection component has the narrow angular luminance distribution.

12 Claims, 3 Drawing Sheets

(56) References Cited

U.S. PATENT DOCUMENTS

| | | | |
|---|---|---|---|
| 2018/0231779 A1* | 8/2018 | Bohn | G02B 27/0081 |
| 2018/0234670 A1* | 8/2018 | Mitani | G02B 27/0172 |
| 2020/0088959 A1* | 3/2020 | Sato | G02B 27/283 |
| 2020/0089000 A1* | 3/2020 | Hayashi | G09G 3/3406 |
| 2020/0089002 A1* | 3/2020 | Lee | G02B 5/30 |

* cited by examiner

OPTICAL DISPLAY SYSTEM AND ELECTRONIC DEVICE

CROSS-REFERENCE TO RELATED APPLICATIONS

This application is a National Stage of International Application No. PCT/CN2021/139685, filed on Dec. 20, 2021, which claims priority to U.S. Provisional Application No. 63/128,281, filed on Dec. 21, 2020, both of which are hereby incorporated by reference in their entireties.

FEDERALLY SPONSORED RESEARCH

The invention was made with funding from GoerTek Electronics, Inc. under project 6501-8684. GoerTek Electronics, Inc. has certain rights in the invention.

FIELD OF THE INVENTION

Embodiments of the present disclosure pertain to the field of optical systems, and more particularly, to an optical display system and an electronic device.

BACKGROUND OF THE INVENTION

Electronic devices usually include one or more displays. For example, cellular phones, smartwatches, and portable computers usually include a direct-view display for presenting information to users. Virtual reality and/or augmented reality devices often include two sets of displays in front of users' eyes.

Displays, such as virtual reality and/or augmented reality displays, may include display panels and display optical components. Display optical components may project or magnify the imagery displayed on the panel. It can be challenging to form an ideal display panel that can match the display optical components. Sometimes, a significant amount of light from the display panel may not enter the display optical components and become stray rays that hinder the performance of the display system.

SUMMARY OF THE INVENTION

One object of this disclosure is to provide a new technical solution for an optical display system.

According to a first aspect of the present disclosure, there is provided an optical display system, comprising: an image generating unit, which generates an image light output, wherein the image light output has a narrow angular luminance distribution; and an optical lens system, which is placed in front of the image generating unit and guides the image light output to an eye of a viewer, wherein the image generating unit includes: an image generating component, which generates a polarized light output; a polarization-dependent light deflection component, disposed to accept the polarized light output from the image-generating component and increase the amount of the polarized light output that can enter an exit pupil of the optical lens system, and the polarized light output deflected by the polarization-dependent light deflection component has the narrow angular luminance distribution.

According to a first aspect of the present disclosure, there is provided an electronic device, comprising the optical display system according to an embodiment of this disclosure.

In various embodiment, the performance of the optical display system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF THE EMBODIMENTS

Figure 1:
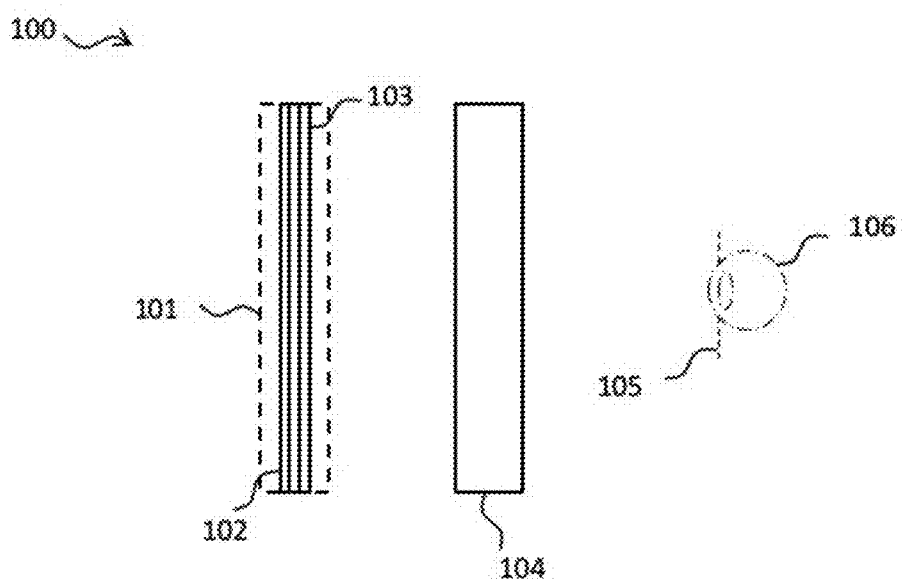
FIG. 1 depicts a schematic diagram of an optical display system according to an embodiment of the present disclosure.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Near-eye display technologies can be used for virtual reality and/or augmented reality devices. Such devices have been widely applied in engineering, design, training, entertainment, retail, etc. Typically, a near-eye display module may include a display panel (image generation unit) and a lens system (image projection unit) for each eye. There are several choices for the display panel, including but not limited to liquid crystal displays, organic light-emitting diode displays, and micro light-emitting diode displays.

For a normal display system, the light emitting from a display panel has a relatively wide angular luminance distribution such that the displayed image can be clearly seen by multiple viewers at different locations and viewing angles. However, this is not suitable for virtual reality and augmented reality devices. For example, most virtual reality and augmented reality devices only have a single viewer and the relative position between the viewer (user) and near-eye display is fixed. Therefore, a large amount of light emitting from the display panel is cannot be received by the pupil of the viewer, which causes a great loss of energy. Also, the rays not intended in the optical design may bounce back and forth between the lens system and display panel, resulting in substantial background noise and therefore reducing the contrast ratio of the near-eye display module.

Additionally, other issues like intensity vignetting and colour shift across the field of view may also exist in near-eye display systems that employ wide-view display panels.

Figure 2:
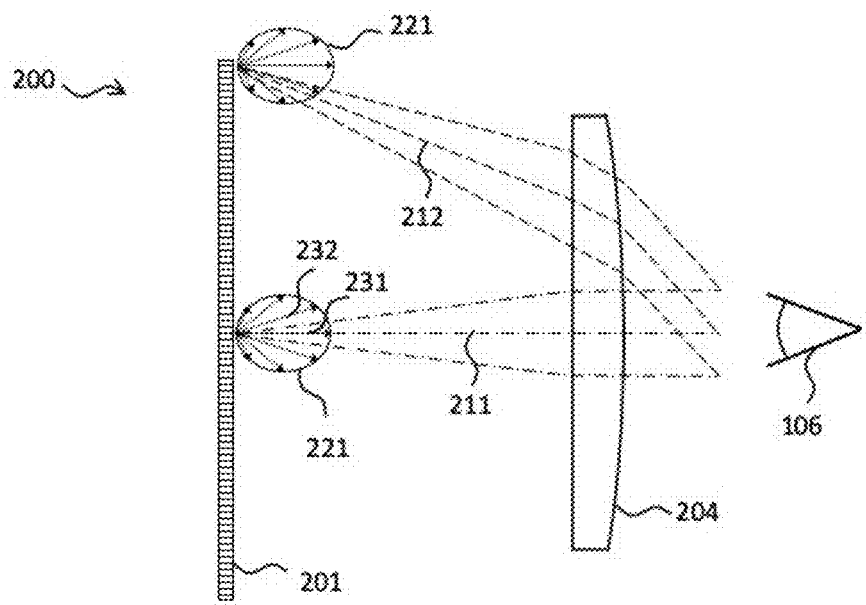
FIG. 2 depicts a cross-section view of a conventional display system.

For example, FIG. 2 depicts a cross-section view of a conventional display system 200. The conventional display system 200 may include a wide-view display panel 201 and a lens set 204. The center field chief ray 211 of the lens set 204 is normal to the wide-view display panel 201. The edge field chief ray 212 of the lens set 204 is not normal to the wide-view display panel 201. The wide-view display panel 201 has a wide angular luminance distribution 221 across its surface. Only part of the rays, such as ray 231, can enter the eye 106. Most of the rays outside of the emitting cone, such as ray 232, become stray light and lower the contrast the conventional display system 200.

Besides, as shown in FIG. 2, the angular luminance distribution 221 of the display panel 201 is relatively wide and the chief ray, such as the chief ray 212, may not be the ray with the highest luminance, which is the ray normal to the display panel 201. This may introduce a higher un-evenness of luminance to a viewer. In addition, this may cause an efficiency loss of luminance of the display panel. Furthermore, the optical display system of a virtual reality and augmented reality display device may be contained in a closed shell. As such, the rays other than the chief rays may travel back and forth inside the virtual reality and augmented reality display device, which become stray light and affect the viewing experiences of a viewer.

Here, an optical display system is proposed, in which a tailored angular luminance distribution is generated for an optical lens system. This optical display system may improve light efficiency and reduce vignetting for viewer(s) in the designed position(s).

FIG. 1 illustrates a schematic diagram of an optical display system 100 according to an embodiment of the disclosure. As presented in FIG. 1, the optical display system 100 may include an image generating unit or a display panel assembly 101 and an optical lens system 104. The image light output generated by the image generating unit 101 will travel through the optical lens system 104 to an exit pupil 105 and into an eye 106 of a viewer.

The image light output has a narrow angular luminance distribution. This means that the angular luminance distribution is relatively narrow compared with a normal display panel such as liquid crystal displays, organic light-emitting diode displays, and micro light-emitting diode displays. For example, a full-with-half-maximum of the narrow angular luminance distribution of the polarized light output is smaller than 30 degrees, 25 degrees, 20 degrees, 15 degrees or 10 degrees. This could be achieved by applying an optical component on a display panel.

The optical lens system 104 is placed in front of the image generating unit 101 and guides the image light output to an eye 106 of a viewer. The optical lens system 104 may be used to magnify the output of the image-generating component. In some embodiment, the optical lens system 104 may include both reflective and refractive optical surfaces. The optical lens system 104 may be configured to guide the light output from the image generating unit 101 to an eyebox located at the exit pupil 105 and then to the viewer's eye 106. For example, the optical lens system 104 includes plastic singlet lens. For example, the optical lens system 104 is or is close to a telecentric optical system, where the chief rays are approximately parallel to the optical axis.

The image generating unit 101 may include an image generating component 102 and polarization-dependent light deflection component.

The image generating component 102 generates a polarized light output. The polarized light output may be circularly polarized light output. The image generating component 102 may include a linearly polarized directional display device with a quarter-wave plate, or an unpolarized directional display device with a circular polarizer.

For example, the image generating component 102 may include a display panel, such as a liquid crystal display or a light-emitting diode display, with a pixel array. the display panel is a liquid crystal display.

For example, the image generating component 102 is a liquid crystal display having a directional backlight unit that enhances the luminance in the normal direction.

For example, the image generating component 102 is an organic light-emitting diode display having a cavity structure that enhances the luminance in the normal direction. The organic light-emitting diode display may use a silicon backplane.

For example, the image generating component 102 is an inorganic light-emitting diode display. The inorganic light-emitting diode display may have a cavity structure that enhances the luminance in the normal direction. The light-emitting diode display may have a nanowire structure. The display panel may have a narrow angular luminance distribution.

For example, the image generating component 102 may be a polychromatic display that has a directional backlight illumination.

The polarization-dependent light deflection component 103 is disposed to accept the polarized light output from the image-generating component 102 and increase the amount of the polarized light output that can enter an exit pupil 105 of the optical lens system 104. The polarization-dependent light deflection component 103 may be disposed on top of the image-generating component 102. The polarized light output deflected by the polarization-dependent light deflection component 103 has the narrow angular luminance distribution. In this regard, the polarization-dependent light deflection component 103 may be any suitable planar optical element that can modify the angular luminance distribution of the light emitting from the image-generating component 102 to enhance the light efficiency and reduce vignetting. In some embodiments, the light deflection layer may be attached to the top surface of the display panel. In some embodiments, the polarization-dependent light deflection component 103 may be integrated directly into the image-generating component 102 as micro-structures on each pixel.

The polarization-dependent light deflection component 103 may be attached to the surface of the image-generating component 102. The polarization-dependent light deflection component 103 may change the angular luminance distribution of the image-generating component 102.

In an example, the polarization-dependent light deflection component 103 may be a diffractive liquid crystal wave-plate. The diffractive liquid crystal wave-plate is capable of modifying the angular luminance distribution of pixels in the image-generating component 102.

Figure 3:
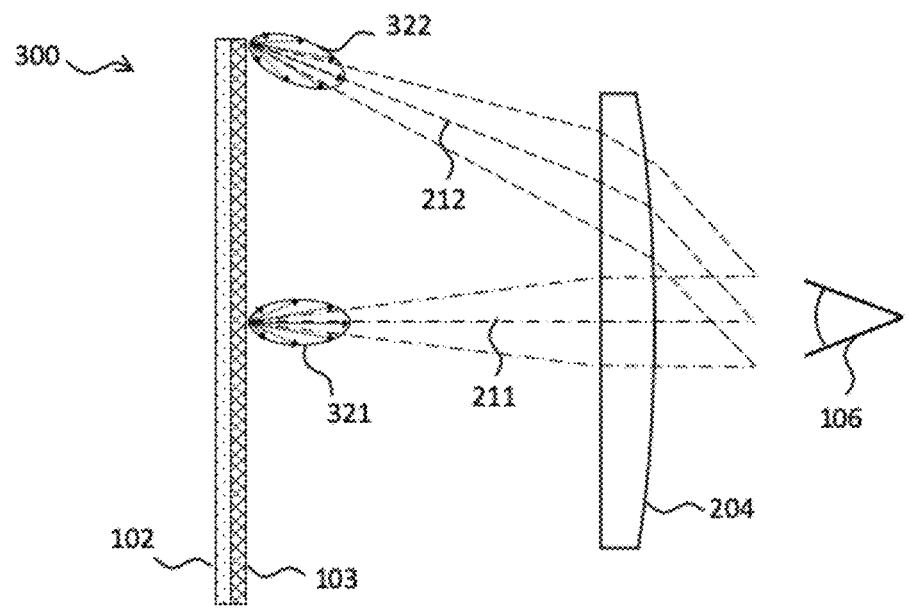
FIG. 3 depicts a cross-section view of an example display system according to an embodiment of the present disclosure.

FIG. 3 shows a light path of an optical display system 300 according to an embodiment of the disclosure.

As shown in FIG. 3, the image generating component 102 generates a polarized light output. The polarization-dependent light deflection component 103 is disposed to accept the polarized light output from the image-generating component 102. The polarization-dependent light deflection component 103 deflects the light output towards the local chief rays of the optical lens system 204 so as to increase the amount of the polarized light output that can enter the eye 106 of a viewer.

In FIG. 3, the chief ray 212 is shown to have the highest luminance. However, in some embodiments, the chief ray 212 may not have the highest luminance. As long as the light output is deflected by the polarization-dependent light deflection component 103 towards the center of the optical lens system 204, the light efficiency will be improved and stray light will be reduced, compared with the configuration of FIG. 2.

The polarization-dependent light deflection component 103 may be a Pancharatnam-Berry phase optical element (PBPOE) made of liquid crystal polymer. A person skilled in the art shall understand that PBPOE is used here just as example and other kinds of deflection components may also be used as long as they can perform the functions as described here.

In this embodiment, the PBPOE 103 is employed to change the angular luminance distribution of the light emitting from the image generating component 102, such as directing more light to the optical lens system 104/204 and further to the exit pupil 105 and eye 106. There may be a circular polarizer or quarter-wave plate placed between the image generating component 102 and the PBPOE 103. In some embodiments, the deflection angle of the PBPOE 103 may be dependent on the input light polarization state.

For example, the light deflection optical element 103 may be a liquid crystal polymer film. The liquid crystal polymer film may be a geometric-phase diffractive optical element with spatial varying optical axis orientations. The liquid crystal film may be fabricated by polymerizable liquid crystal reactive mesogens and photo-alignment method. In some embodiments, the PBPOE 103 may be a liquid crystal polymer film. The optical axis of the liquid crystal film may be patterned to achieve the desired optical functionality. The liquid crystal pattern may vary across the surface of the display panel 102.

In another embodiment, the polarization-dependent light deflection component 103 is a meta-surface. The meta-surface may show a constant deflection angle for all display wavelengths at a single location on the image-generating component 102. The meta-surface may be fabricated with all-dielectric materials. The meta-surface may have several sub-layers.

As shown in FIG. 3, the angular luminance distribution 322 may be asymmetric with respect to the normal of surface of the image-generating component 102. The angular luminance distribution may vary at different locations of the display panel to increase the amount of light that can pass through the optical lens system and enters the user's pupil.

The polarized light output generated from the image-generating component 102 has a narrow angular luminance distribution 321, 322. For example, a full-with-half-maximum of the narrow angular luminance distribution of the polarized light output is smaller than 30 degrees, 25 degrees, 20 degrees, 15 degrees or 10 degrees.

As such, most of the rays emitting from the center of the image-generating component 102 can reach the optical lens system (lens set) 104 and then enter the eye 106. So, the light component from the center part which is going to enter the eye 106 will be increased and thus the stray light generated by the center light component will be reduced.

Furthermore, polarization-dependent light deflection component 103 alters (deflects) the angular luminance distribution of the light emitting from the image-generating component 102 at off-center fields. The angular luminance distribution of light at off-center fields, such as the distribution 322, is modified by the polarization-dependent light deflection component 103 such that most of the light can pass through the optical lens system 104 and reach the eye 106.

In some embodiments, the image-generating component 102 may be a liquid crystal display with a directional backlight. In some embodiments, the image-generating component 102 may be a light-emitting diode display with a strong cavity configured to achieve an enhanced emission in the directional normal to the display surface.

In this embodiment, it is proposed to use an image-generating component with narrow angular luminance distribution of polarized light output together with a polarization-dependent light deflection component. This combination can improve the display quality of an optical display system, especially, for a near-eye display. For example, if only an image-generating component with narrow angular luminance distribution is used in the optical display system without the polarization-dependent light deflection component, an un-even luminance distribution may occur in the whole displayed image. Furthermore, the polarized light output will make it easy for the deflection component to deflect the light output efficiently.

In an example, an orientation of the liquid crystal polymer in the light deflection component 103 is symmetric with respect to the optical axis of the optical lens system 104/204. By this arrangement, the angular luminance distribution can be modified by the polarization-dependent light deflection component 103 based on the distances from the center of the optical lens system 104/204, so as to achieve a relatively even luminance distribution in the whole image.

The angular luminance distribution varies at different locations of the display panel to increase the amount of light that can pass through the optical lens system and enters the viewer's pupil. For example, with the varying angular luminance distribution, more light will be guided by the optical lens system 104/204 to the eye 106. Furthermore, because of varying angular luminance distribution, the burden of optical adjustment by the optical lens system 104/204 will be relieved and the optical performance of the display system will be improved. For example, the distortion introduced by the optical lens system may be reduced.

In an example, the narrow angular luminance distribution is controlled with the light deflection optical element 103. For example, the narrow angular luminance distribution is controlled with the light deflection optical element 103, so that rays emitting in the direction normal to a surface of the image-generating component 102 are deflected by the polarization-dependent light deflection component 103 into the directions close to center of the optical lens system. The polarization-dependent light deflection component 103 may have a spatial-varying deflection angle. The deflection angle may depend on the chief ray directions of the optical lens system. As such, the polarization-dependent light deflection component 103 can increase the amount of display light that can pass through the optical lens system and enter the user's pupil.

In another example, the narrow angular luminance distribution may be modified with the light deflection optical element 103 in a pixel-based manner. In this way, a higher light efficiency could be achieved and stray light may further be reduced.

In addition, even if the relative position between the viewer and near-eye display is fixed in most situation, the viewer would sometimes like to change the posture or position or the viewer may be changed, which may lead to a change of the relative position. Such a change is relatively small but still has influence on the viewing experience of the viewer. In this regard, the light deflection optical element 103 may be an electronic controlled deflection optical element, so as to track the position changes of the eye.

Figure 4:
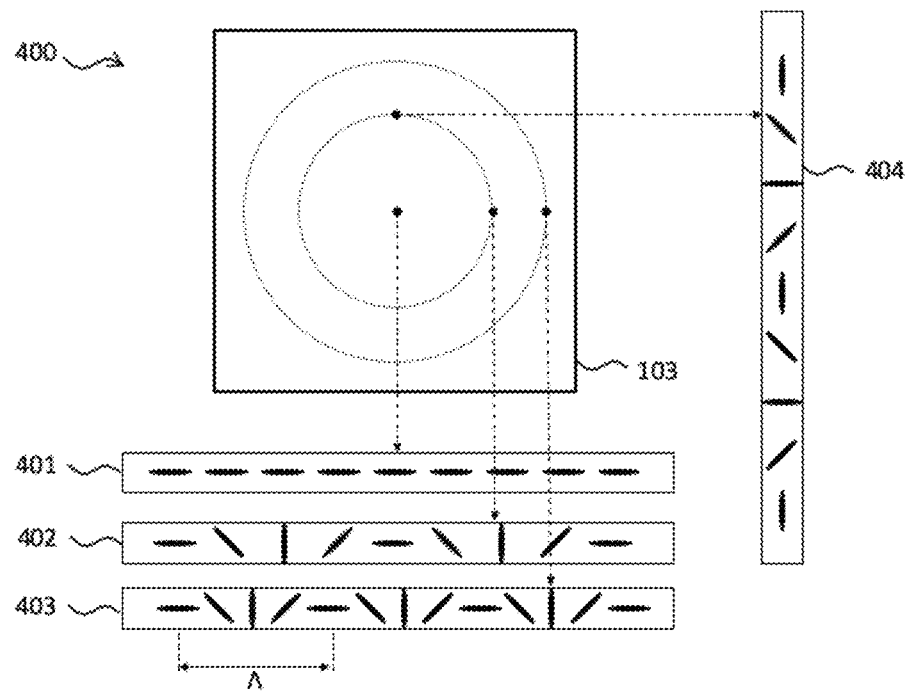
FIG. 4 depicts a liquid crystal orientation in an example light deflection layer, according to an embodiment of the present disclosure.

FIG. 4 depicts the liquid crystal orientations in an example polarization-dependent light deflection component 400, according to an embodiment of the present disclosure. The azimuth angle of liquid crystal molecules may be uniform in the region where the chief ray is normal to the display surface, i.e. center of the image-generating component 102, such as the orientation 401 shown in FIG. 4. In the PBPOE-based 1 polarization-dependent light deflection component 103, the liquid crystal orientation may change continuously with a varying pitch A in the region where the chief ray is not parallel to the optical axis, such as ray 212. In some embodiments, the pitch A of liquid crystal orientation 403 at the peripheral of the PBPOE 103 may be smaller than that of orientation 402 between the center and edge of the PBPOE 103. In some embodiments, the pitch A of liquid crystal orientation may be symmetric with respect to the center of the PBPOE 103. For example, the pitch A of liquid crystal orientation 404 may be the same as that in liquid crystal orientation 402.

Figure 5:
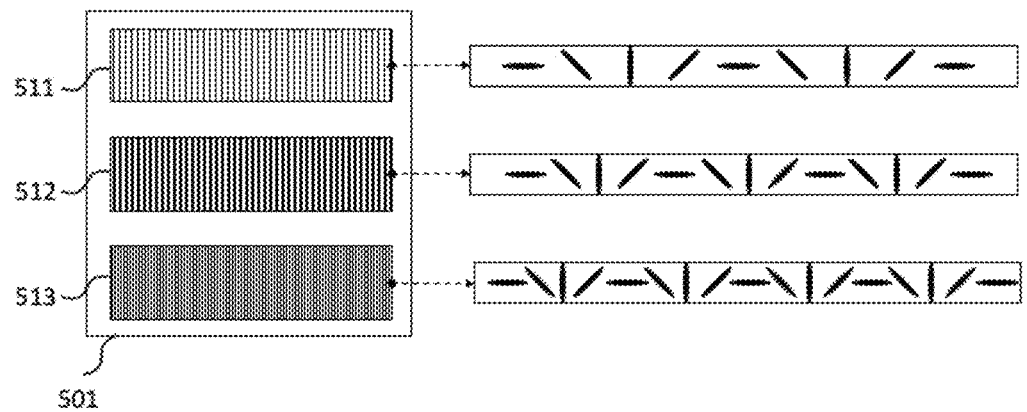
FIG. 5 depicts a liquid crystal orientation on top of an example pixel, according to an embodiment of the present disclosure.

FIG. 5 depicts the liquid crystal orientation on top of an example pixel 501 with red-green-blue subpixels, according to an embodiment of the present disclosure. In some embodiments of the present disclosure, the polarization-dependent light deflection component 103 has distinct structures on red, green, and blue subpixels. As shown in FIG. 5, the PBPOE 103 on top of each subpixel may have a distinct orientation. Within each pixel, the pitch of liquid crystal orientation may vary among colour-channels. For example, liquid crystal orientation on top of the red pixel 511 may have the longest pitch, while that of the blue pixel 513 may have the shortest pitch. In some embodiments, within a single pixel region, the peak direction of angular luminance distributions of red pixel 511, green pixel 512 and blue pixel 513 are kept the same when the light passes through the PBPOE 103 on top of the pixel 501.

In various embodiment, by controlling the angular luminance distribution of the light with a polarization-dependent light deflection component, more light rays emitting from the image-generating component can pass through the optical lens system. By using different deflection patterns across the image-generating component, the image brightness and uniformity as observed by the users can be enhanced.

Figure 6:
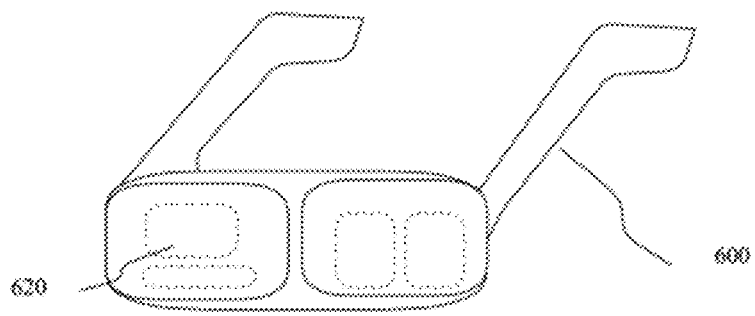
FIG. 6 depicts an electronic device according to an embodiment of this disclosure.

FIG. 6 depicts an electronic device according to an embodiment of this disclosure. As shown in FIG. 6, the electronic device 600 comprises the optical display system 620 as described above. The electronic device may be a near-eye display device and can be used for virtual reality and/or augmented reality display.

Although some specific embodiments of the present invention have been demonstrated in detail with examples, it should be understood by a person skilled in the art that the above examples are only intended to be illustrative but not to limit the scope of the present disclosure.

The invention claimed is:

1. An optical display system, comprising:
an image generating unit, which generates an image light output, wherein the image light output has an angular luminance distribution; and
an optical lens system including an exit pupil, adapted for placement in front of the image generating unit to guide the image light output to an eye of a viewer via the exit pupil;
wherein the image generating unit includes:
an image generating component, which generates a polarized light output as the image light output; and
a polarization-dependent light deflection component, disposed to accept the polarized light output from the image-generating component and increase the amount of the polarized light output that enters the exit pupil of the optical lens system by deflection,
wherein the polarized light output deflected by the polarization-dependent light deflection component has the angular luminance distribution.

2. The optical display system of claim 1, wherein the optical display system is a near-eye display module.

3. The optical display system of claim 1, wherein a full-with-half-maximum of the angular luminance distribution of the polarized light output is smaller than 30 degrees, 25 degrees, 20 degrees, 15 degrees or 10 degrees.

4. The optical display system of claim 1, wherein the polarization-dependent light deflection component is a Pancharatnam-Berry phase optical element made of liquid crystal polymer.

5. The optical display system of claim 4, wherein an orientation of the liquid crystal polymer in the light deflection component is symmetric with respect to an optical axis of the optical lens system.

6. The optical display system of claim 5, wherein the angular luminance distribution varies at different locations of the image generating unit to increase the amount of light that passes through the optical lens system and enters the viewer's eye.

7. The optical display system of claim 1, wherein the angular luminance distribution is controlled with the light deflection optical element.

8. The optical display system of claim 7, wherein the angular luminance distribution is controlled with the light deflection optical element, so that rays emitting in the direction normal to a surface of the image-generating component are deflected by the polarization-dependent light deflection component into one or more directions close to local chief rays of the optical lens system.

9. The optical display system of claim 7, wherein the angular luminance distribution is modified with the light deflection optical element in a pixel-based manner.

10. The optical display system of claim 1, wherein the image generating component is selected from the group consisting of a linearly polarized directional display device with a quarter-wave plate, and an unpolarized directional display device with a circular polarizer.

11. The optical display system of claim 1, wherein the optical lens system includes an optically reflective surface and an optically refractive surface.

12. An electronic device, comprising an optical display system, wherein the optical display system comprises:
- an image generating unit, which generates an image light output, wherein the image light output has an angular luminance distribution; and
- an optical lens system including an exit pupil, adapted for placement in front of the image generating unit to guide the image light output to an eye of a viewer via the exit pupil;
- wherein the image generating unit includes:
- an image generating component, which generates a polarized light output as the image light output; and
- a polarization-dependent light deflection component, disposed to accept the polarized light output from the image-generating component and increase the amount of the polarized light output that enters the exit pupil of the optical lens system by deflection,
- wherein the polarized light output deflected by the polarization-dependent light deflection component has the angular luminance distribution.

* * * * *